(No Model.)
N. B. POWTER.
PROCESS OF UTILIZING GARBAGE AND SIMILAR WASTE PRODUCTS.
No. 530,126. Patented Dec. 4, 1894.
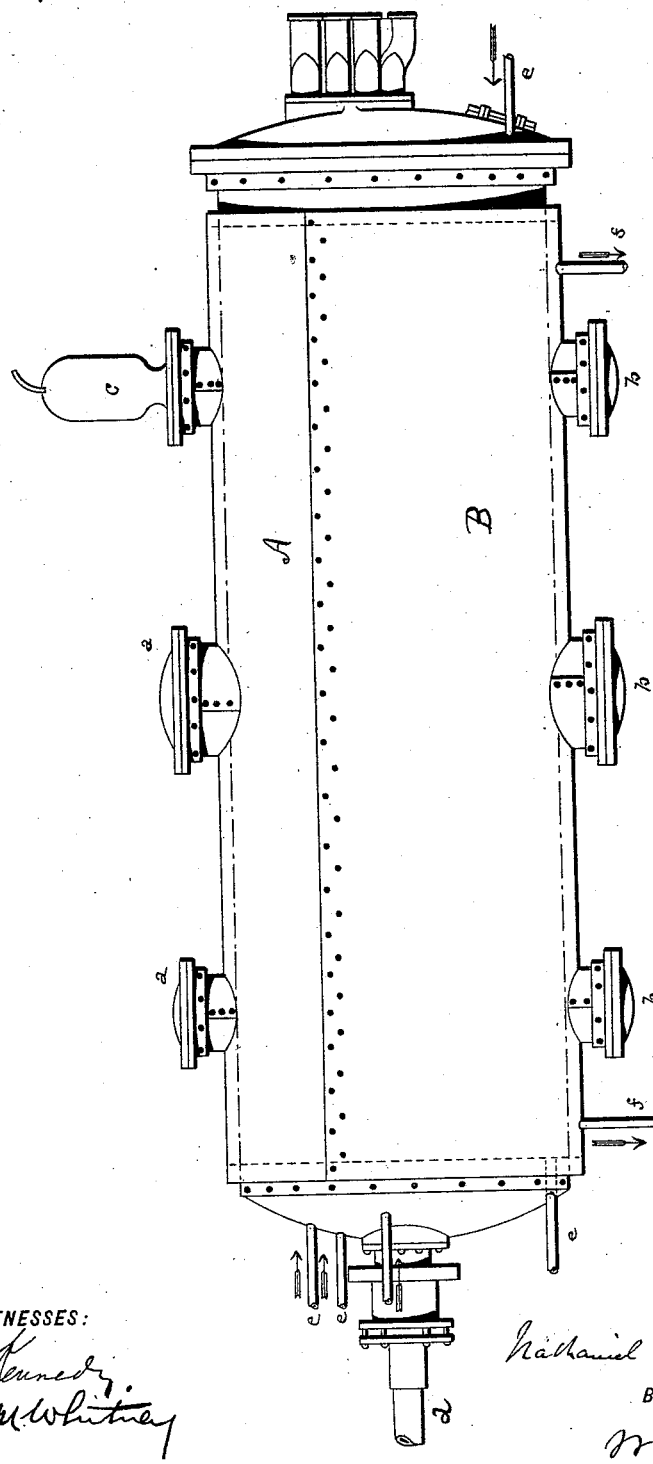
WITNESSES:
INVENTOR
BY
ATTORNEY

UNITED STATES PATENT OFFICE.

NATHANIEL B. POWTER, OF NEW YORK, N. Y.

PROCESS OF UTILIZING GARBAGE AND SIMILAR WASTE PRODUCTS.

SPECIFICATION forming part of Letters Patent No. 530,126, dated December 4, 1894.

Application filed January 5, 1894. Serial No. 495,850. (No specimens.)

*To all whom it may concern:*

Be it known that I, NATHANIEL B. POWTER, a subject of Her Britannic Majesty, and a resident of the city, county, and State of New York, have invented certain new and useful Improvements in Methods of Utilizing Garbage and other Waste Products, of which the following is a specification.

The object of my invention is to provide a quick and economical method of utilizing the valuable elements contained in such substances as slaughter house refuse, fish refuse, city garbage, and refuse from bone boiling establishments and other substances, which, by reason of their containing organic animal or vegetable matter in a state of partial decay, have to be treated rapidly and under conditions which shall not be deleterious to the public health.

My improved process consists in first subjecting the substance to be treated to a boiling or steaming process until the matter becomes reduced to a consistence known as sludge or slush. It is sometimes advisable to add a little sulfuric acid to the mass, while undergoing this boiling or steaming process. After the matter has assumed the condition of sludge, the grease may be removed by skimming or other convenient method, clarified and sold.

The second step of the process consists in thoroughly mixing with this sludge a proper amount of alumina phosphate containing insoluble phosphoric acid, such as the natural phosphate of lime carrrying alumina and iron. The amount of phosphate required varies from five per cent. upward according to the character of the substances composing the sludge; but about fifteen per cent. of phosphate will in most cases answer the purpose. The mixture is then evaporated to dryness in a vacuum, being constantly agitated or stirred during the evaporation to prevent solidifying. After this simultaneous stirring and evaporating in the vacuum has continued for about three hours, the mass will become dry and granular, bearing somewhat the appearance of coarse, brown sugar, when the vacuum is boken by the admission of air, and the batch of material treated can be easily removed by shovels or scoops and put into boxes, bags or barrels, as desired, and shipped for use as a fertilizer, the valuable properties of the organic matter treated and of the phosphate being retained in the granular mass and being readily soluble and set free, when applied to the fields in the usual manner of fertilizers.

The apparatus used for carrying out this process is preferably, as shown in the accompanying drawing, a horizontal tank of a cylindrical form A partially surrounded by a steam jacket B. The tank is provided with a man hole *a—a* for inserting the various ingredients, with the discharge openings *b—b—b* for removing the finished product, and the exhaust *c* connected with a vacuum pipe, not shown, by which a vacuum in the tank is created, if desired. It is also provided with a central longitudinal shaft *d* carrying stirring arms, not shown, in the interior of the tank. Inlet pipes *e* admit steam to the interior of the tank and taps or inlets *f—f* admit steam to the steam jacket or exhaust the same, as desired.

I claim—

1. The above described method of utilizing garbage and other waste products, which consists, first in reducing the same to a condition of sludge by steaming or boiling in the presence of sulfuric acid and removing the grease therefrom; second, mixing the sludge with a proper amount of insoluble alumina phosphate and lastly, subjecting the same to a simultaneous stirring and evaporation in vacuum, until the same is converted into a dry, granular mass, substantially as described and for the purposes specified.

2. The above described method of utilizing garbage and other waste products, which consists, first, in reducing the same to a condition of sludge by steaming or boiling and removing the grease therefrom; second, mixing the sludge with alumina phosphate; and lastly, subjecting the same to a simultaneous stirring and evaporation in vacuum until the same is converted into a dry, granular mass, substantially as described and for the purposes specified.

3. The above described method of utilizing garbage and other waste products, which consists, first, in reducing the same to a condition of sludge by steaming or boiling in the presence of sulfuric acid and removing the grease therefrom; second, mixing the sludge with a proper amount of phosphate of lime or other suitable phosphate; and lastly, subjecting the same to a simultaneous stirring and evaporating in vacuum, until the same is converted into a dry, granular mass, substantially as described and for the purposes specified.

4. The above described method of utilizing garbage and other waste products, which consists, first, in reducing the same to a condition of sludge by steaming or boiling and removing the grease therefrom; second, mixing the sludge with phosphate of lime or other suitable phosphate; and lastly, subjecting the same to a simultaneous stirring and evaporating in vacuum, until the same is converted into a dry, granular mass, substantially as described and for the purposes specified.

N. B. POWTER.

Witnesses:
J. KENNEDY,
W. P. PREBLE, Jr.

It is hereby certified that Letters Patent No. 530,126, granted December 4, 1894, upon the application of Nathaniel B. Powter, of New York, N. Y., for an improvement in "Processes of Utilizing Garbage and Similar Waste Products," were erroneously issued to said Powter as owner of said invention; whereas said Letters Patent should have been issued to *Samuel Montgomery Roosevelt, of same place*, said Roosevelt being assignee of the entire interest in said invention as shown by the assignments of record in this office; and that the said Letters Patent should be read with this correction therein that the same may conform to the record of the case in the Patent Office.

Signed, countersigned, and sealed this 1st day of January, A. D. 1895.

[SEAL.]
JNO. M. REYNOLDS,
*Assistant Secretary of the Interior.*

Countersigned:
JOHN S. SEYMOUR,
*Commissioner of Patents.*